US012234673B2

(12) United States Patent
Blanchard et al.

(10) Patent No.: US 12,234,673 B2
(45) **Date of Patent: *Feb. 25, 2025**

(54) DUAL FUNCTION SECURITY/FIRE LOCKING MECHANISM FOR FIRE RATED DEVICES

(71) Applicant: Schlage Lock Company LLC, Carmel, IN (US)

(72) Inventors: Walter T. Blanchard, Brownsburg, IN (US); Jack R. Lehner, Jr., Indianapolis, IN (US)

(73) Assignee: Schlage Lock Company LLC, Carmel, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/216,858

(22) Filed: Jun. 30, 2023

(65) Prior Publication Data

US 2024/0141699 A1 May 2, 2024

Related U.S. Application Data

(63) Continuation of application No. 17/474,233, filed on Sep. 14, 2021, now Pat. No. 11,692,373, which is a (Continued)

(51) Int. Cl.

*E05B 65/10* (2006.01)
*E05B 15/16* (2006.01)

(52) U.S. Cl.

CPC ............ *E05B 65/104* (2013.01); *E05B 15/16* (2013.01); *E05B 65/1053* (2013.01);

(Continued)

(58) Field of Classification Search

None

See application file for complete search history.

(56) References Cited

U.S. PATENT DOCUMENTS 3,705,739 A 12/1972 Adler
4,145,900 A * 3/1979 Ohno .................... E05B 65/104 70/92

(Continued)

FOREIGN PATENT DOCUMENTS

EP 1162334 B1 6/2005

OTHER PUBLICATIONS

International Search Report; International Searching Authority; International Patent Application No. PCT/US2017/059701; May 29, 2018; 4 pages.

(Continued)

*Primary Examiner* — Carlos Lugo

(74) *Attorney, Agent, or Firm* — Taft Stettinius & Hollister LLP

(57) ABSTRACT

An exit device located in a door frame having a door strike including a latchbolt assembly, a pushbar assembly, and a link assembly. The latchbolt assembly includes an extended position configured to engage the door strike, and a retracted position configured to move past the door strike. The pushbar assembly moves from a released position to a pressed position to move the latchbolt assembly from the extended position to the retracted position. The link assembly is operatively connected to the pushbar assembly and includes a security link having an elongated aperture and a pin configured to extend through the elongated aperture about which the security link rotates. A keeper surrounds the pin and supports the security link for rotation. In the event of extreme heat, the keeper melts and the security link moves to a position to substantially prevent opening of the door.

20 Claims, 11 Drawing Sheets

Related U.S. Application Data continuation of application No. 16/807,995, filed on Mar. 3, 2020, now Pat. No. 11,118,377, which is a continuation of application No. 15/342,196, filed on Nov. 3, 2016, now Pat. No. 10,577,832.

(52) U.S. Cl.
CPC ......... *E05B 65/1093* (2013.01); *Y10S 292/66* (2013.01); *Y10T 292/0908* (2015.04)

(56) References Cited

U.S. PATENT DOCUMENTS

| | | | |
|---|---|---|---|
| 4,437,693 | A | 3/1984 | Godec |
| 4,884,832 | A | 12/1989 | Bungard |
| 5,380,053 | A | 1/1995 | Saino |
| 5,427,420 | A | 6/1995 | Moore |
| 5,464,259 | A | 11/1995 | Cohrs et al. |
| 5,690,371 | A | 11/1997 | Turnbull |
| 5,890,752 | A | 4/1999 | Lin |
| 6,205,825 | B1 | 3/2001 | Haeck et al. |
| 6,532,777 | B2 | 3/2003 | Haeck et al. |
| 6,570,481 | B2 | 5/2003 | Katsube et al. |
| 6,820,905 | B1 | 11/2004 | Haeck et al. |
| 6,854,773 | B2 | 2/2005 | Lin |
| 7,070,210 | B2 | 7/2006 | Lin |
| 7,488,012 | B2 | 2/2009 | Eller et al. |
| 7,712,800 | B2 | 5/2010 | Peng |
| 8,146,961 | B2 | 4/2012 | Schacht |
| 8,191,939 | B2 | 6/2012 | Lin |
| 8,474,885 | B2 | 7/2013 | Lu et al. |
| 8,528,946 | B2 | 9/2013 | Shen |
| 8,544,897 | B2 | 10/2013 | Tien |
| 8,702,132 | B2 | 4/2014 | Tien |
| 10,577,832 | B2 | 3/2020 | Blanchard et al. |
| 11,118,377 | B2 | 9/2021 | Blanchard et al. |
| 2001/0005996 | A1 | 7/2001 | Haeck et al. |
| 2004/0183311 | A1 | 9/2004 | Lin |
| 2009/0051172 | A1 | 2/2009 | Yu et al. |
| 2010/0007154 | A1 | 1/2010 | Schacht |
| 2012/0256428 | A1 | 10/2012 | Tien |
| 2013/0093195 | A1 | 4/2013 | Tien |

OTHER PUBLICATIONS

Written Opinion of the International Searching Authority; International Searching Authority; International Application No. PCT/US2017/059701; May 29, 2018; 5 pages.

Canadian Office Action; Canadian Intellectual Property Office; Canadian Patent Application No. 3,046,779, Jun. 10, 2020; 3 pages.

Extended European Search Report; European Patent Office; European Patent Application No. 17866736.6; May 29, 2020; 8 pages.

Extended European Search Report; European Patent Office; European Patent Application No. 22216836.1; Jun. 12, 2023; 8 pages.

* cited by examiner

DUAL FUNCTION SECURITY/FIRE LOCKING MECHANISM FOR FIRE RATED DEVICES

CROSS REFERENCE TO RELATED APPLICATIONS

The present application is a continuation of U.S. patent application Ser. No. 17/474,233 filed Sep. 14, 2021 and issued as U.S. Pat. No. 11,692,373, which is a continuation of U.S. patent application Ser. No. 16/807,995 filed Mar. 3, 2020 and issued as U.S. Pat. No. 11,118,377, which is a continuation of U.S. patent application Ser. No. 15/342,196 filed Nov. 3, 2016 and issued as U.S. Pat. No. 10,577,832, the contents of each application are incorporated herein by reference in their entirety.

TECHNICAL FIELD

The present invention generally relates to exit devices, and more particularly to a pushbar-type exit device.

BACKGROUND

Commercial or public buildings are typically required by law to provide for an emergency exit in case of the occurrence of an adverse event, such as a fire. One common type of emergency exit is a latch-closed double door where both doors are mounted within a single door frame. Another common variety of an emergency exit is a latch-closed single door mounted within a door frame. An exit device at the door may be used by individuals to quickly exit the building via the emergency exit. Different types of exit devices include panic bars, push pads, and pushbars. A pushbar is typically located on a door at a convenient height for an individual to push when exiting through the door. Pushing the pushbar actuates retraction of a latchbolt, thereby allowing the door to be opened.

The legal requirements of emergency exits and exit devices include a requirement for maximum fire containment. As a result, the doors are equipped with fire rated exit devices. In some instances, fire hose streams and other external forces can be exerted on exit device components and may create unintentional mechanical inputs from the egress side of the door, potentially causing the door to open and resulting in fire propagation or spreading.

What is therefore needed is a pushbar having a disabling mechanism to substantially prevent latchbolt retraction which could enable the door to be unintentionally opened, possibly resulting in fire propagation or spreading.

SUMMARY

A dual function security/fire locking mechanism is provided for fire rated devices in which a retraction of a latchbolt of a latchbolt assembly is substantially prevented to disable the door from being opened by external mechanical forces during or after a fire. A keeper of the latchbolt assembly includes a material that is displaced by high temperatures and which enables movement of a security link to a position which blocks movement of the latchbolt assembly.

In one embodiment, there is provided an exit device for a door located in a door frame having a door strike. The exit device includes a latchbolt assembly having an extended position configured to engage the door strike, and a retracted position configured to move past the door strike when the door is moved from a closed position to an open position. A pushbar assembly includes a released position and a pressed position, wherein movement of the pushbar from the released position to the pressed position displaces the latchbolt assembly from the extended position to the retracted position. A link assembly is operatively connected to the pushbar assembly and includes a security link having an elongated aperture and a pin configured to extend through the elongated aperture to define a rotational axis about which the security link rotates.

In another embodiment, there is provided an exit device for a door located in a door frame having a door strike. The latchbolt assembly includes an extended position configured to engage the door strike, and a retracted position configured to move past the door strike. A pushbar assembly includes a released position and a pressed position, wherein movement of the pushbar from the released position to the pressed position displaces the latchbolt assembly from the extended position to the retracted position. A link assembly is operatively connected to the pushbar assembly, wherein the link assembly includes an aperture configured to engage a pivot member located at a first position within the aperture when exposed to a first temperature, and located at a second position within the aperture when exposed to a second temperature higher than the first temperature.

DETAILED DESCRIPTION OF ILLUSTRATIVE EMBODIMENTS

Figure 1:
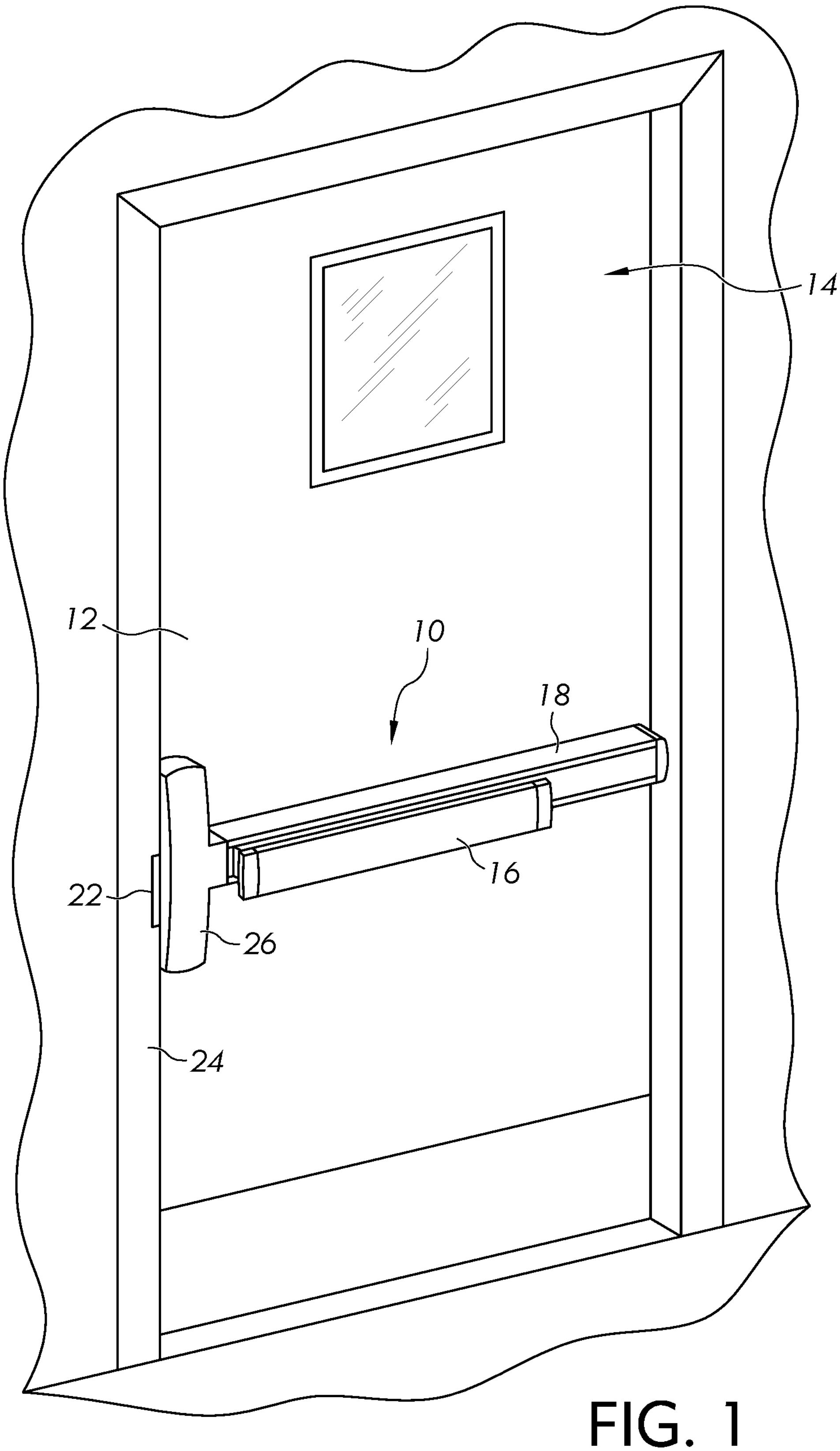
FIG. 1 illustrates an exit device according to one embodiment, as mounted on a door positioned within a door frame.

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

FIG. 1 illustrates an exit device 10 according to one embodiment. The exit device 10 is mounted on an inside 12 of a door 14 for locking and unlocking the door 14. The door 14 is generally used as an emergency exit or fire exit of a building. More particularly, the exit device 10 remains locked when a pushbar 16 is positioned in an extended or released position with respect to a housing 18 of the exit device, thereby preventing a person from accessing or opening the door 14 from outside the building or from the other side of the door.

To unlock the door 14 from the inside of the building, a user pushes or actuates the pushbar 16 to a pressed or contracted position with respect to the housing 18. Pressing the pushbar 16 actuates a locking mechanism (further described below) to unlock the door 14. In the illustrated construction, a latchbolt 20 (see FIG. 2), which is operably connected to a locking mechanism of the exit device 10, extends from the exit device 10 to lock and unlock the door 14. The door 14 is locked when the latchbolt 20 extends from the exit device 10 and is received within a receiving aperture of a door frame 24 or placed against a strike 22 located at the door frame 24. The door 14 is unlocked by a user pressing the pushbar 16 toward the housing 18 and consequently toward the door 14. Pushing of the pushbar 16 actuates the locking mechanism to retract the latch bolt 20, while at the same time supplies a force to move the door 14 from the closed position toward the open position. The locking mechanism is covered by a locking mechanism housing 26.

Figure 2:
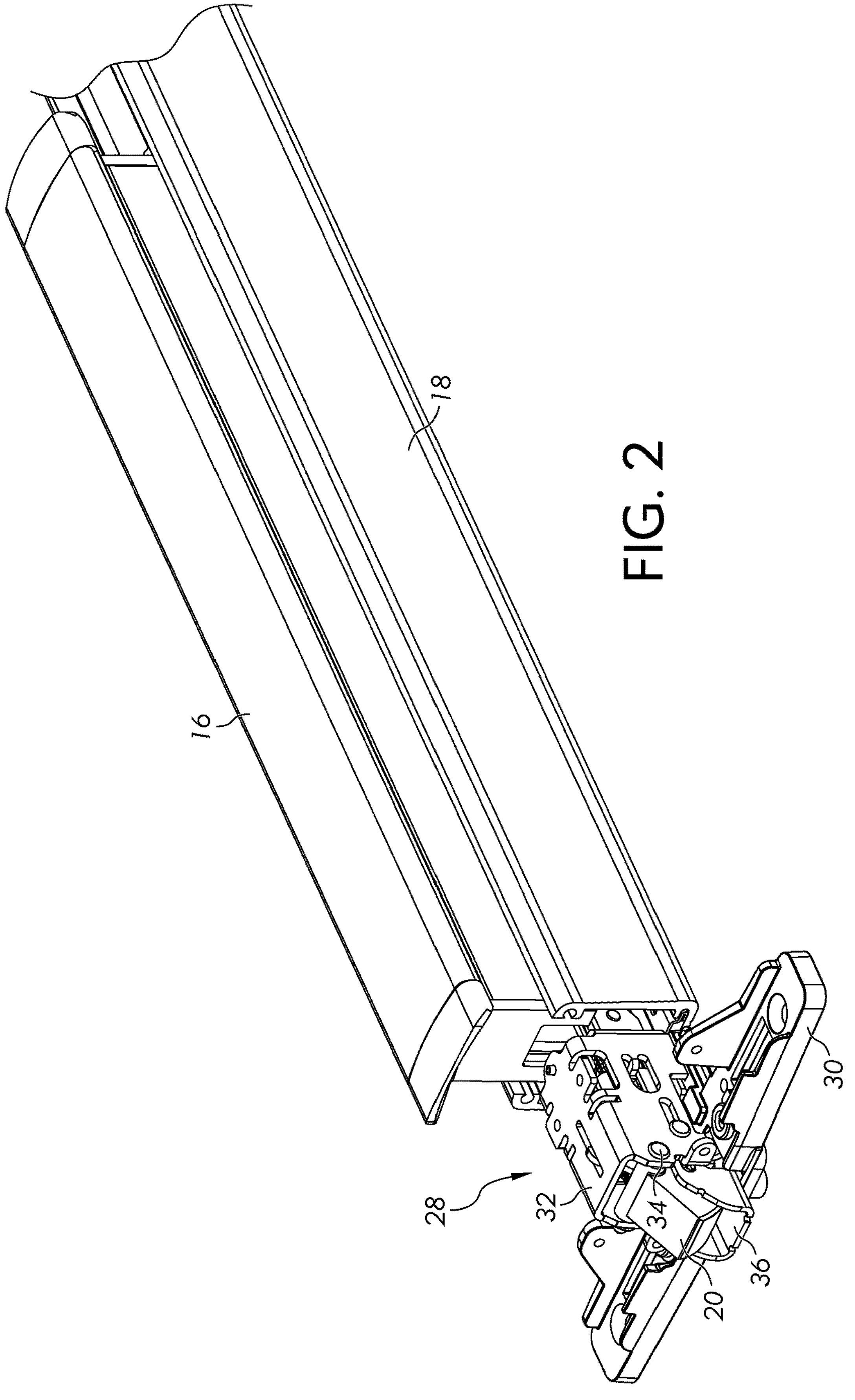
FIG. 2 illustrates the exit device of FIG. 1 with a latch bolt in an extended position.

FIG. 2 illustrates a perspective view of the exit device 10 including the pushbar 16, the housing 18, and the latch bolt 20 which extends from a locking mechanism 28. The locking mechanism housing 26 is not shown for clarity. The locking mechanism 28 includes a frame 30 adapted to be affixed to the door 14 in a location generally aligned with the strike 22 located on the door frame 24. A latch bolt mounting bracket 32 is coupled to the frame 30 and rotatably supports the latchbolt 20 at a pin 34 which extends through the bracket 32. Upon pressing of the pushbar 16 toward the frame 30, the latchbolt 20 is rotatably moved about the pin 34 in a direction toward the housing 18, and an auxiliary latchbolt 36 is slidingly retracted toward the housing 18. The pressing of the pushbar 16 therefore moves both the latchbolt 20 and the auxiliary latchbolt 36 away from the strike 22 to enable the door to be unlocked and opened.

Figure 3:
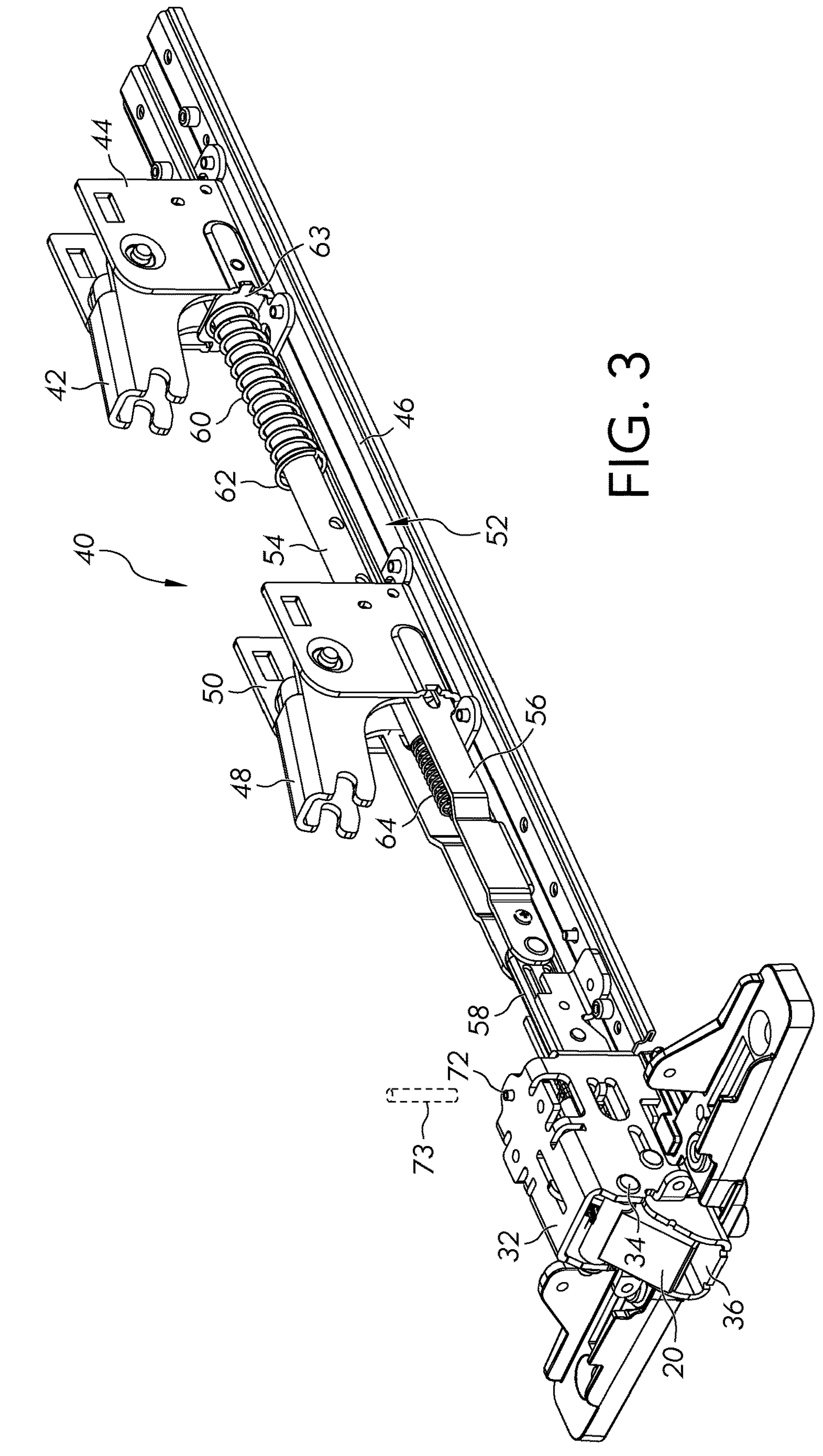
FIG. 3 illustrates internal components of the exit device of FIG. 2 with the pushbar and housing removed.

FIG. 3 illustrates a perspective view of the exit device 10, with the pushbar 16 and the housing 18 removed to show internal components of the exit device including an actuating mechanism 40 which responds to movement of the pushbar 16 toward the housing 18 to actuate the latchbolt 20. The actuating mechanism 40 includes a first bell crank 42 rotatably coupled to a first mounting bracket 44 which is fixedly supported by a base plate 46, and a second bell crank 48 rotatably coupled to a second mounting bracket 50 that is also fixedly supported by the base plate 46. A drive assembly 52 is operatively connected to the first bell crank 42, the second bell crank 48, and the latchbolt 20. Movement of the pushbar 16 moves each of the first and second bell cranks 42 and 48, which in turn move the drive assembly 52 to retract the latchbolt 20 and the auxiliary latchbolt 36 from the illustrated positions. Upon release of the pushbar 16, the pushbar 16 is returned to the position of FIG. 2 by the drive assembly 52 via spring loading.

The drive assembly 52 includes a drive bar 54 which moves longitudinally along the base plate 52 in both directions. The drive bar 54 is operatively connected to a split link 56, which is in turn operatively connected to a locking link 58. The drive bar 54 is located within a main spring 60 which has one end fixed in position by a collar 62 fixedly coupled to the drive bar 54. The other end of the main spring 60 is fixedly located at a second collar 63 located at the bracket 44. A terminating end of the drive bar 54 is operatively connected to the split link 56 with a link spring 64.

Movement of the drive bar 54 is transmitted by the split link 56 and the locking link 58 to the latchbolt 20. Movement of the drive bar 54 in a rightward direction (as illustrated), also known as a retracting direction and resulting from pushing of the pushbar 16, causes the latchbolt 20 to retract toward an unlatching position. The main spring 60 is compressed between the collar 62 and the mounting bracket 44. The second collar 63 acts as an anchor such that the main spring 60 exerts a main spring biasing force on the collar 62 and toward the latchbolt 20 to maintain the latchbolt 20 in the extended position when the pushbar 16 is in the extended position. Pressing of the pushbar 16 moves each of the bell cranks 42 and 48 toward the base plate 46, which in turn moves the drive assembly 52, and in particular the drive bar 54, in a rightward direction to retract the latchbolt 20. At the same time, the main spring 62 and the link spring 64 are compressed, which increases the tension of each, which is then released once the pushbar 16 is released to return the latchbolt 20 to the extended position.

Figure 4:
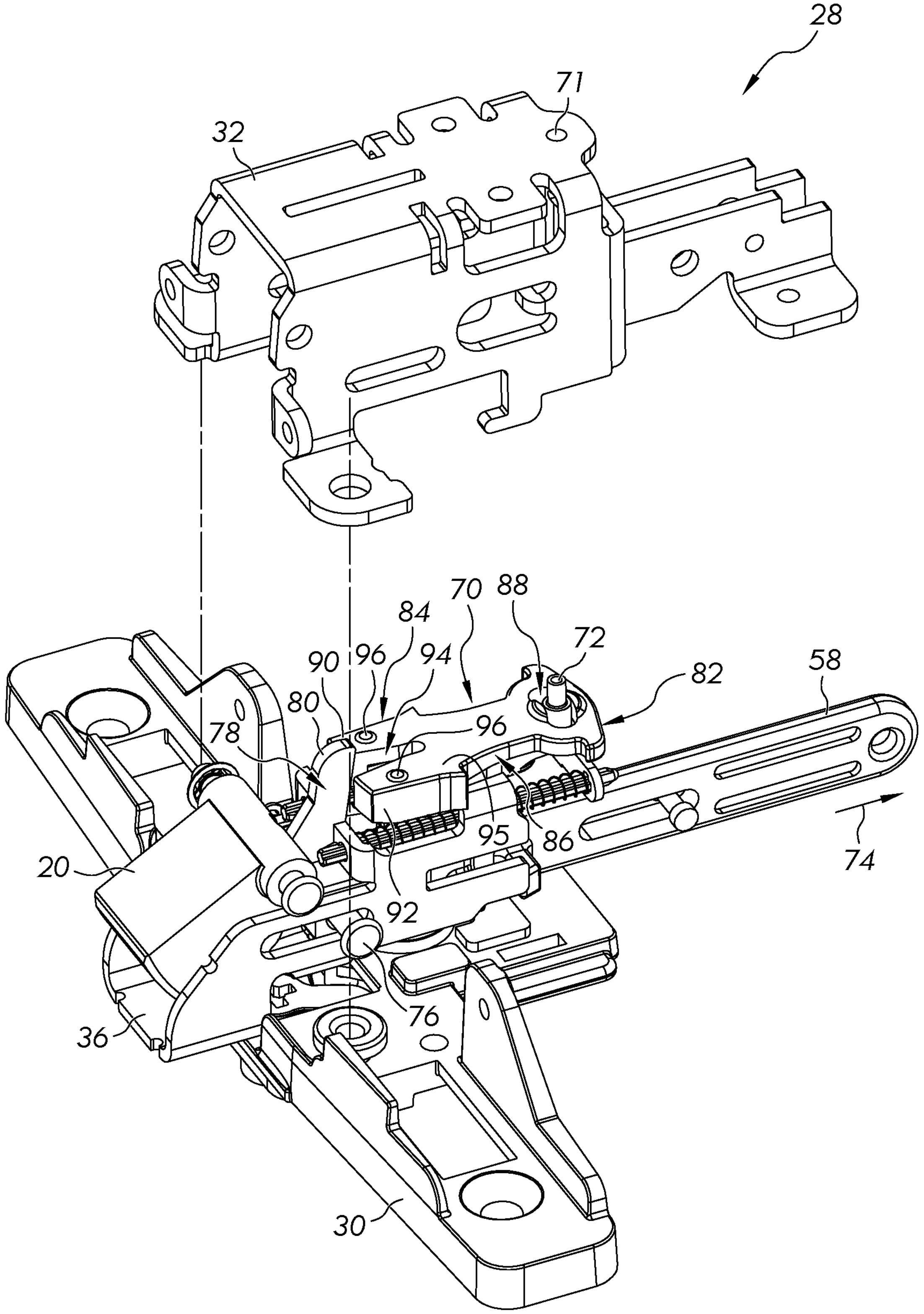
FIG. 4 illustrates a perspective top view a latchbolt assembly of the exit device of FIGS. 2 and 3 including an extended latch bolt and a security link.

FIG. 4 illustrates a perspective top view of the latchbolt assembly 28 of the exit device 10 of FIG. 3, including the extended latch bolt 20 and a security link 70. As illustrated in FIG. 4, the mounting bracket 32 is offset from the frame 30 to more clearly show the security link 70. The security link 70, however, is coupled to the mounting bracket 32 at an aperture 71 with a pin 72 which defines an axis of rotation of the security link 70.

To retract the latchbolt 20, the locking link 58 moves in a direction 74, which in turn pulls the auxiliary latchbolt 36 in the same direction with a pin 76 extending through the latchbolt link 36. At the same time, the latchbolt 20 rotates in a counterclockwise direction (as illustrated) about the pin 34 in response to movement of a latchbolt link 78, which is also moved in the direction 74 by movement of the locking link 58. The latchbolt link 78 includes an extension or pawl 80.

The security link 70 includes a first end portion 82, a second end portion 84, and a central portion 86 disposed therebetween. The first end portion 82 defines an elongated aperture 88 through which the pin 72 extends. The second end portion 84 includes a first finger 90 and a second finger 92, each of which extends from the central portion 86 and which are separated by a void or space 94. The void 94 is sufficiently sized to receive the pawl 80. Each of the first and second fingers 90 and 92 includes a surface 95 having a projection 96. The projections 96 contact an interior surface of the mounting bracket 32 to reduce frictional forces between the security link 70 and the mounting bracket 32 to enable the security link 70 to move relatively freely within the mounting bracket 32.

Figure 5:
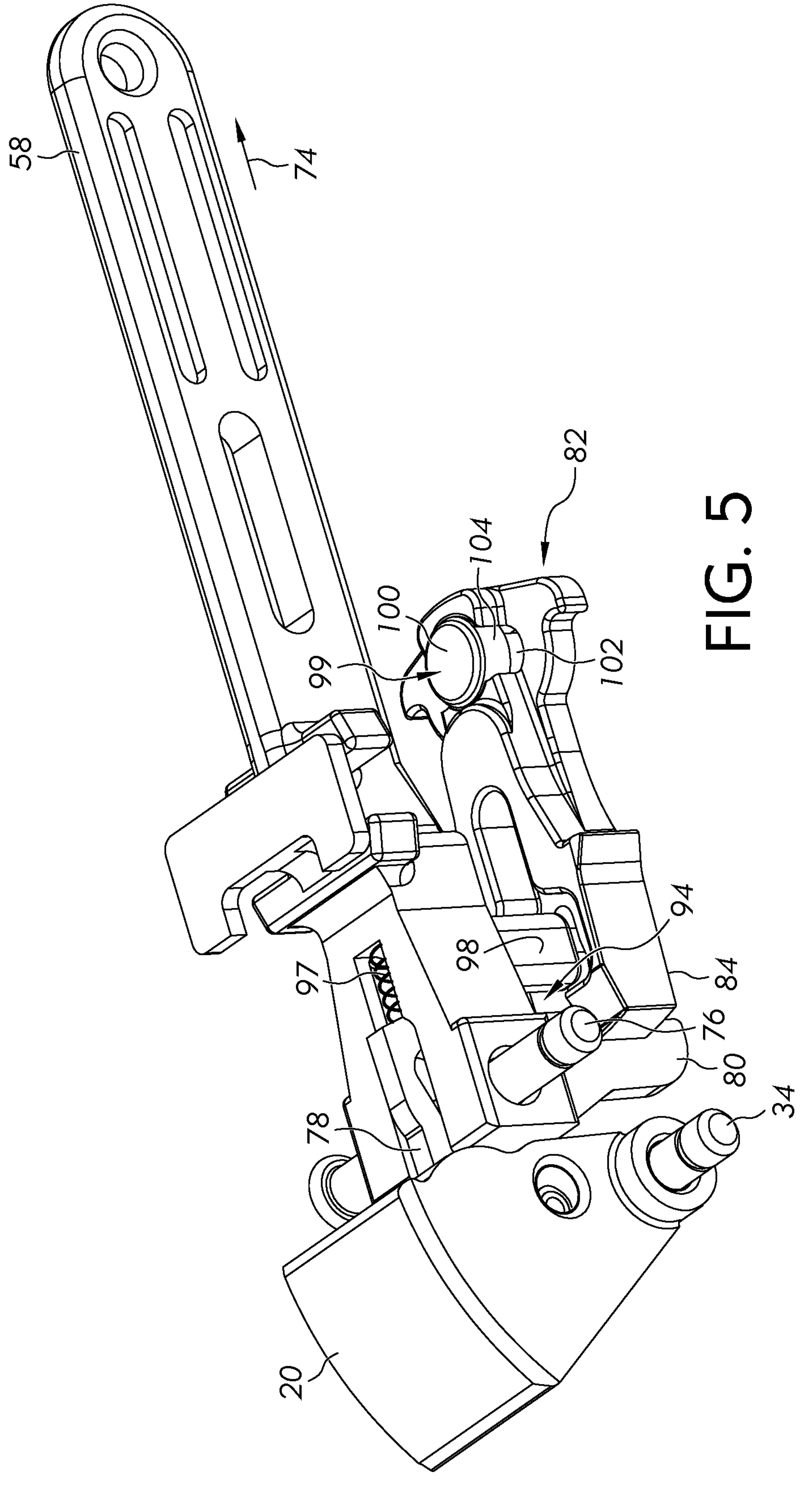
FIG. 5 illustrates a perspective bottom view of the latchbolt assembly of FIG. 4 including an extended latch bolt and a security link.

FIG. 5 illustrates a perspective bottom view of the latchbolt assembly 28 of FIG. 4 including the extended latch bolt 20 and the security link 70. In this configuration, the pushbar 16 is in the released position of FIG. 2 and the latchbolt 20 is in a position to block the opening of the door 14 by engaging the strike 22. A longitudinal axis of the security link 70 is aligned with the longitudinal axis of the base 46.

In this position, the pawl 80 of the latchbolt link 78 is biased at the void 94 by a spring 97. The locking link 58 includes an extending portion 98 which is located within the void 94. When the pawl 80 is located outside of the void 94, rotational movement of the security link 70 in either direction places one of the first finger 90 and second finger 92 in a position to block movement of the pawl 80 when moved in the direction 74.

Figure 10:
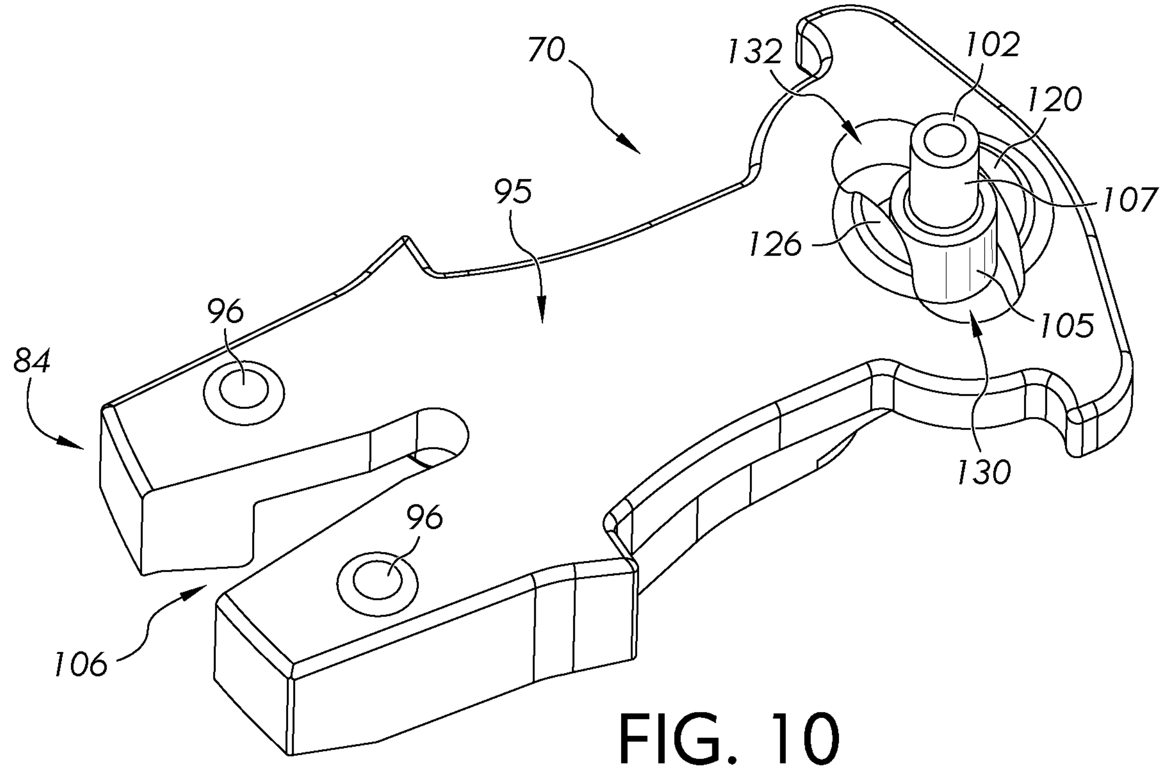
FIG. 10 illustrates a bottom perspective view of a keeper and a rivet of a latchbolt assembly.

In one embodiment, the exit device 10 includes an externally accessible aperture, which may be located in the housing 26, and which is configured to receive a pin tumbler key, a hex key, or any other type of suitable key. The key 73 is configured to move the security link 70 about its rotational axis and to move one of the first finger 90 and second finger 92 to a position which blocks movement of the pawl 80 in the direction 74, effectively placing the exit device in a locked state. The security link 70 rotates about the pin 72, which in the illustrated embodiment of FIG. 5 is configured as a rivet 99 including a head 100 and a shaft 102 (see also FIG. 7) which extends through a keeper 104. The shaft 102 is stepped to include a first section 105 disposed adjacent to the head 100 and a second section 107, as shown in FIG. 10. The first section 105 is located within the keeper 104. In one embodiment, the keeper 104 is configured as a washer having a circular outer circumference and defining a height and central aperture. In other embodiments, the keeper 104 may take other suitable forms.

Figure 6:
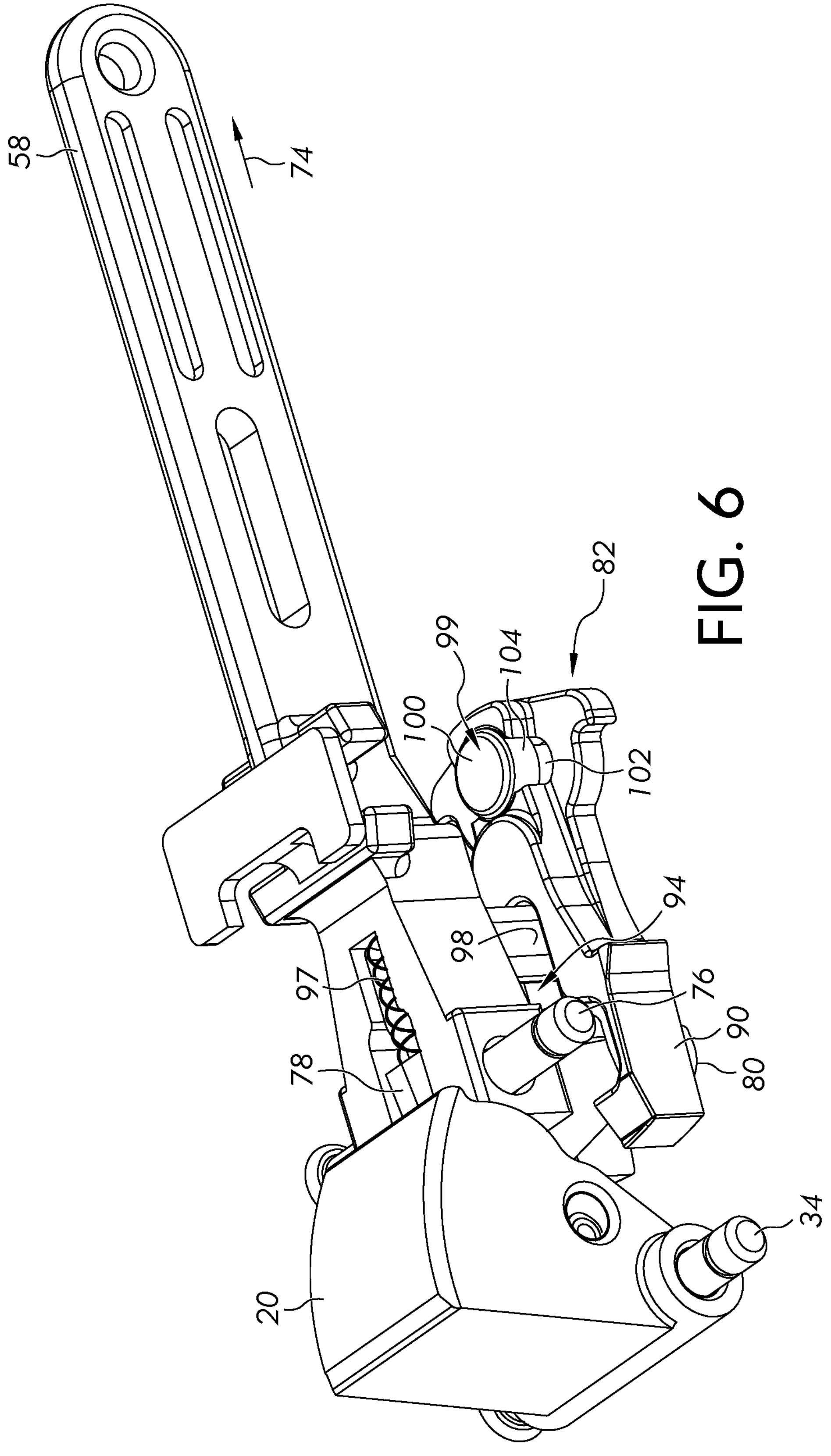
FIG. 6 illustrates a bottom perspective view the latchbolt assembly of FIG. 5 including a retracted latch bolt and a security link.
Figure 7:
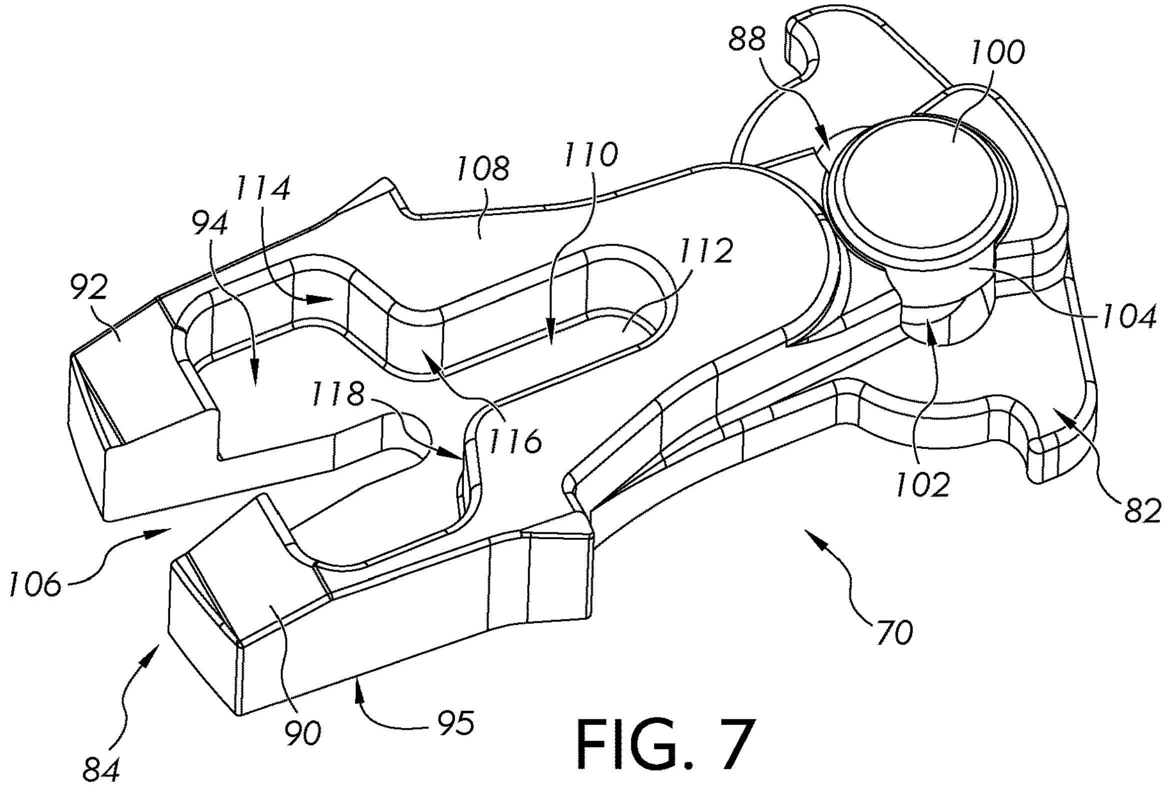
FIG. 7 illustrates a top perspective view of a security link, a rivet, and a keeper of a latchbolt assembly.

FIG. 6 illustrates a perspective bottom view of the latchbolt assembly of FIG. 5 including a retracted latch bolt 20. In this configuration, the extending portion 98 has moved toward the rivet 99, and the pawl 80 has moved further into the void 94. As can be seen in FIG. 7, the void 94 includes a first portion 106 which extends completely through and from the surface 95 to a surface 108 of the security link 70, and a second portion 110 which extends from the surface 108 to a floor 112 of the security link 70. The extending portion 98 includes a length which is insufficient to extend past the floor 112 such that the extending portion 98 can move into the second portion 110 of the void 94. The void 94 is defined by a sidewall 114 which is positioned adjacent to the floor 112. The sidewall 114 includes a first curved area 116 and a second curved area 118 which define an entrance to the second portion 110. Each of the curved areas 116 and 118 define contact surfaces which enable the extending portion 98 to contact these areas and to move into the second portion 110 if the security link 70 is not sufficiently aligned. This configuration enables the locking link 58 to move in the direction 74, as necessary, to move the latchbolt 20 away from the strike 22 a sufficient distance to permit the door 14 to open.

Figure 8:
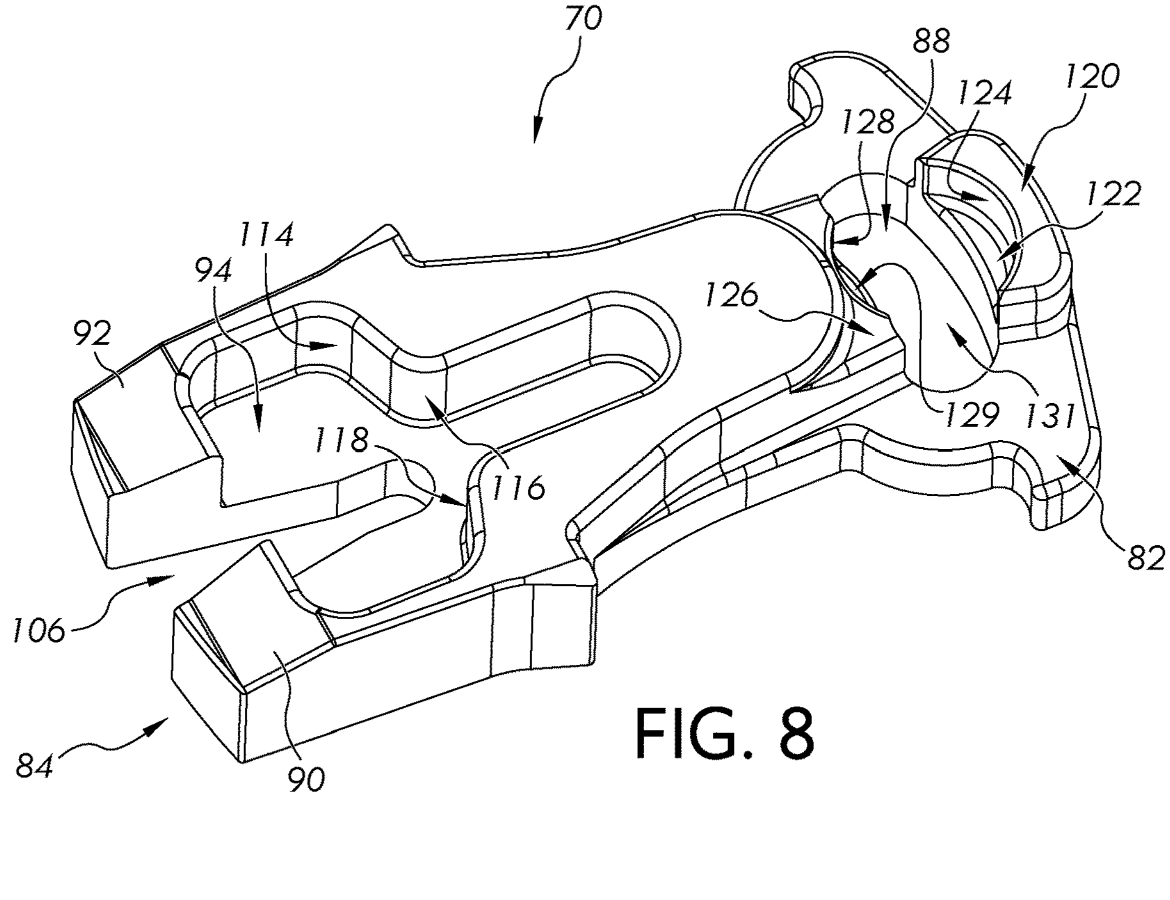
FIG. 8 illustrates a top perspective view of a security link of a latchbolt assembly.

FIG. 8 illustrates a top perspective view of the security link 70 without the rivet 99 or the keeper 104 to more clearly illustrate further elements of the elongated aperture 88. The elongated aperture 88 extends completely through the first end 82 of the security link 70 to enable the pin 102 of the rivet 99 to be operatively connected to the mounting bracket 32. The keeper 104 is located between the head 100 of the rivet 99 and a first retaining wall 120 defining an aperture shelf 122 and a sidewall 124. A second retaining wall 126 is located opposite the first retaining sidewall 120 and includes a sidewall 128. The second retaining wall 126 also defines a shelf 129. Each of the sidewalls 124 and 128 define surfaces configured to accommodate an outer circumferential surface of the keeper 104. Each of the shelves 122 and 129 provide an abutting surface for the keeper 104. The keeper 104 provides a rotational interface between the rivet 99 and the security link 70.

Figure 9:
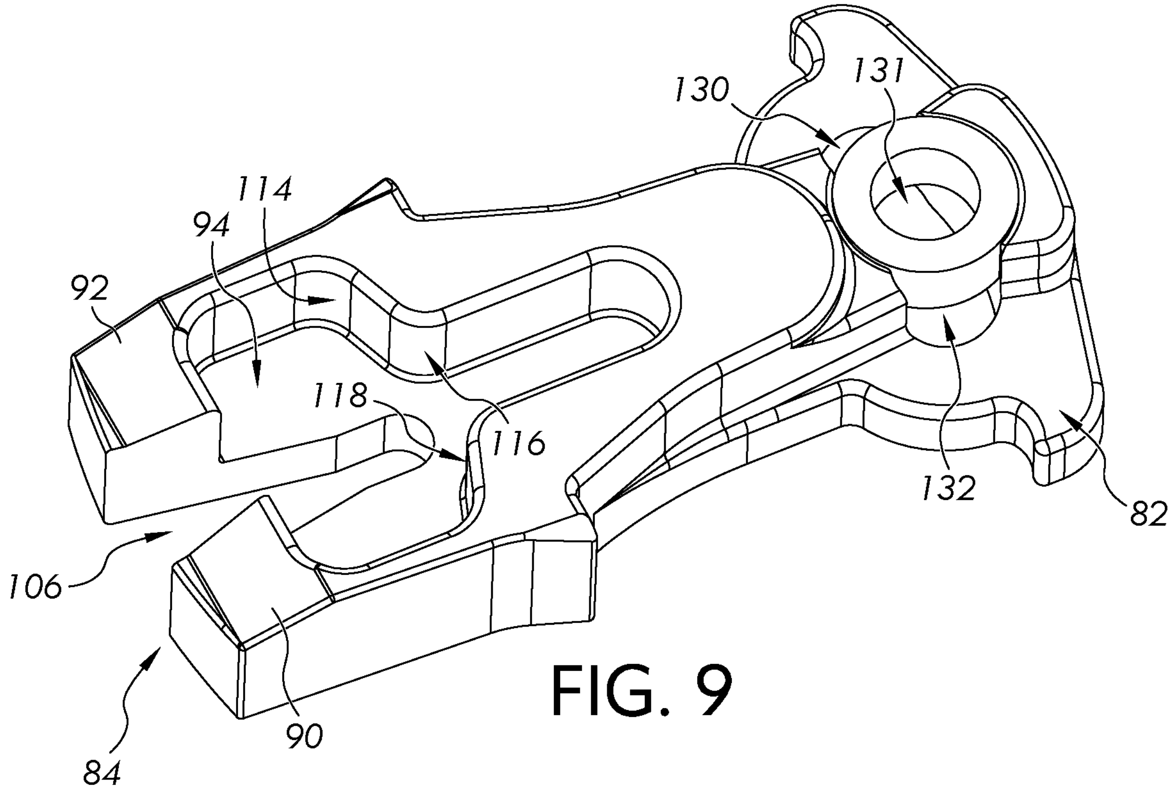
FIG. 9 illustrates a top perspective view of a security link and a keeper of a latchbolt assembly.

As seen in FIGS. 8 and 9, the keeper 104 is held within a central portion 131 of the elongated aperture 88 such that a first open portion 130 and a second open portion 132 of the elongated aperture are located on either side of the keeper 104. In one embodiment, the elongated aperture 88 is curved. However, it should be understood that other configurations fall within the scope of the present disclosure.

FIG. 10 illustrates the side 95 of the security link 70 and the first section 105 which includes a length sufficient to extend past the keeper 104 and which is located between the first retaining wall 120 and the second retaining wall 126. The surfaces of the first retaining wall 120 and second retaining wall 126 are positioned closer together at this location compared to the sidewalls 124 and 128 which engage the keeper 104. The first section 105 is rotatably retained at this location to provide rotational support for the shaft 102.

The keeper 104 is formed of a resilient and solid material which loses its solid structure when subjected to heat or high temperatures generated by a fire. In the event of being subjected to a high temperature, the keeper 104 melts at its location around the rivet 99, and the melted keeper material falls away from the rivet 99 toward a floor of the building in response to gravity, where it can remain within the housing 18. Since the elongated aperture 88 includes the first open portion 130 and the second open portion 132, the material can fall into the open portion closest to the floor. By placing an open portion on either side of the center portion 131, the exit device 10 can be located on a door hinged either at the left side or the right side of the door.

In one embodiment, the resilient material is a material which melts rather than burns when subjected to high heat or temperatures. Consequently, when the housing 26 of the locking mechanism 28 is subjected to high heat or temperatures, the material which was solid becomes a semi-solid or liquid, and flows downwardly and away from the shaft 102. While different types of material for the keeper with a melting point above 400° F. can be utilized, in one embodiment nylon is used having a predetermined melting point. In other embodiments, a polymeric or plastic material which melts at a designated temperature to allow the security link to be displaced from the first position to the second position is used. Since nylon can melt, rather than burn, when subjected to high temperatures, the melted and liquid nylon flows relatively well into the adjacent open portion. In one embodiment, nylon 46 is used and has a melting point of 563 degrees Fahrenheit. In other embodiments, other types of nylon are used. Additionally, the melting point need not be 563 degrees, but other melting points above or below 563 degrees are contemplated.

The security link 70 includes a center of mass that ensures free rotation about the rotational axis of the rivet 99 when the rivet is located at center portion 131. In this position, the security link 70 can be moved to block movement of the latchbolt link 78 to provide a "security mode". In addition, as the keeper 104 melts, the center of mass ensures translation of the security link 70 along the elongated aperture 88. Once melted, the entire security link 70 moves downwardly where it is located to provide a "fire lock-out mode". In one embodiment, the link is made of a material having a melting point that meets or exceeds 2500° F. to withstand the extreme exothermic conditions of a proximate fire.

Figure 11A:
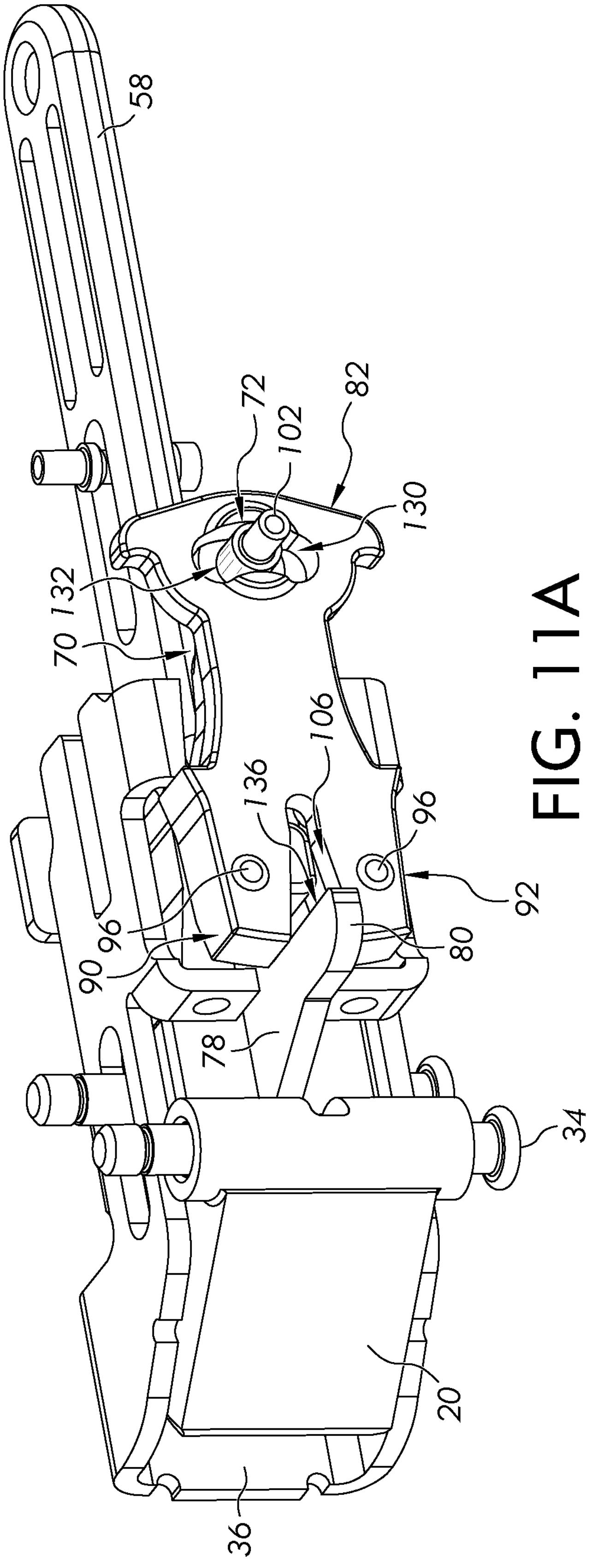
FIGS. 11A and 11B illustrate side elevational views of a portion of a latchbolt assembly including a security link in different positions.
Figure 11B:
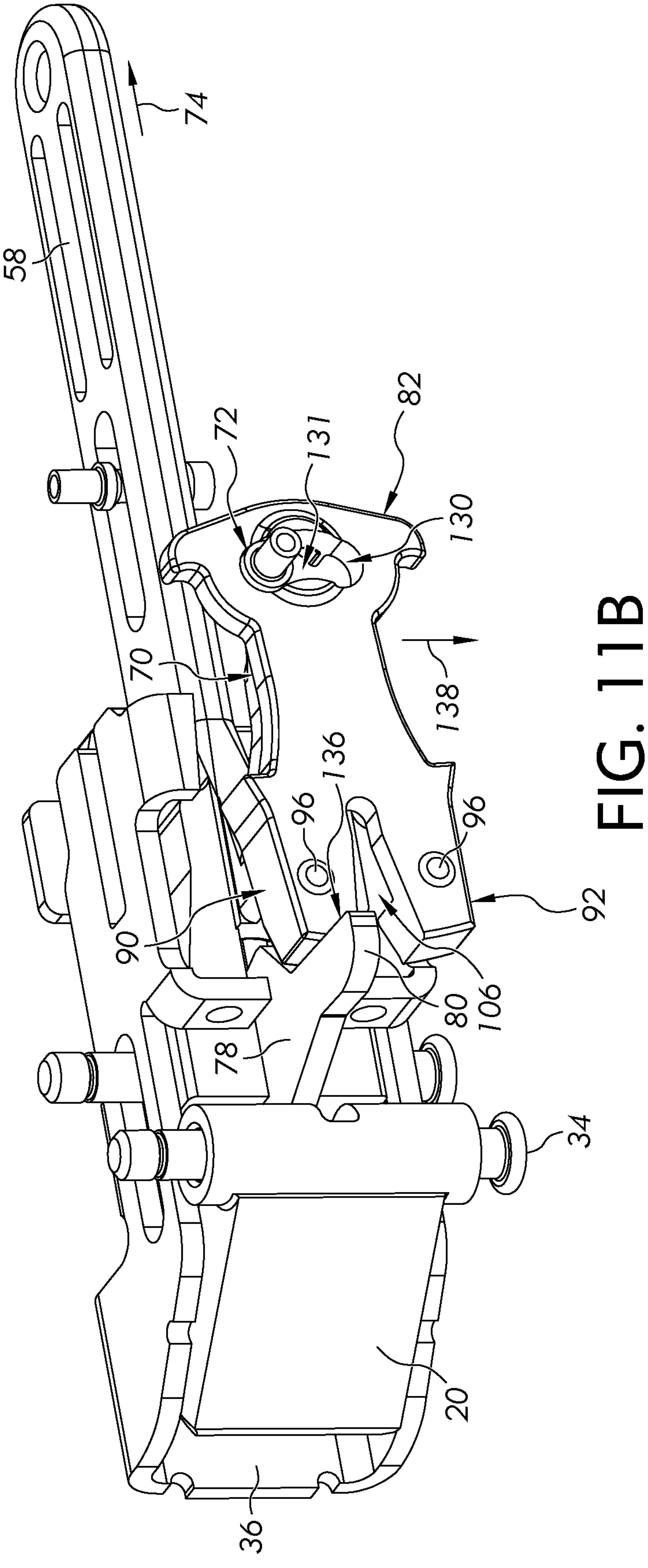

FIGS. 11A and 11B illustrate a side elevational view of a portion of a latchbolt assembly including the security link 70 located in different positions. In FIG. 11A, the security link 70 is located in a position aligned with the longitudinal axis of the locking link 58. The security link 70 is located in this position when the pushbar 16 is located in the released position and the latchbolt 20 and the auxiliary latchbolt 36 are located in the extended position to engage the strike 22. In this position, a front edge 136 of the latchbolt link 78 is located outside of the first portion 106 of the void 94 such that the security link 70 is rotatable about the pivot pin 72. If it is desired to lock the exit device 10, the security link 70 is rotated about the pivot pin 72 with a key, for instance, as described above.

However, if the exit device 10 is subjected to sufficient extreme temperatures, the keeper 104 fails and no longer provides a pivotable support for the pivot pin 72, as illustrated in FIG. 11B. Once the keeper 104 falls away from the pivot pin 72, upon losing its initial shape as a result of the heat or high temperatures, the end 82 of the security link 70 falls in a direction 138 due to gravity. The open end 130 provides a location for the melted keeper 104 to fall away from the pivot pin 72. The open end 132 as it descends in the direction 138 receives the pivot pin 72 where it remains. At the same time or about the same time, the end 92 also falls in the direction 138 such that the finger 90 moves past the front edge 136 of the latchbolt link 78. In this position, the security link 70 is positioned to block movement of the latchbolt link 78 in the direction 74. By blocking movement of the latchbolt link 78, retraction of the latchbolt 20 and the auxiliary latchbolt 36 is substantially prevented.

Figure 12:
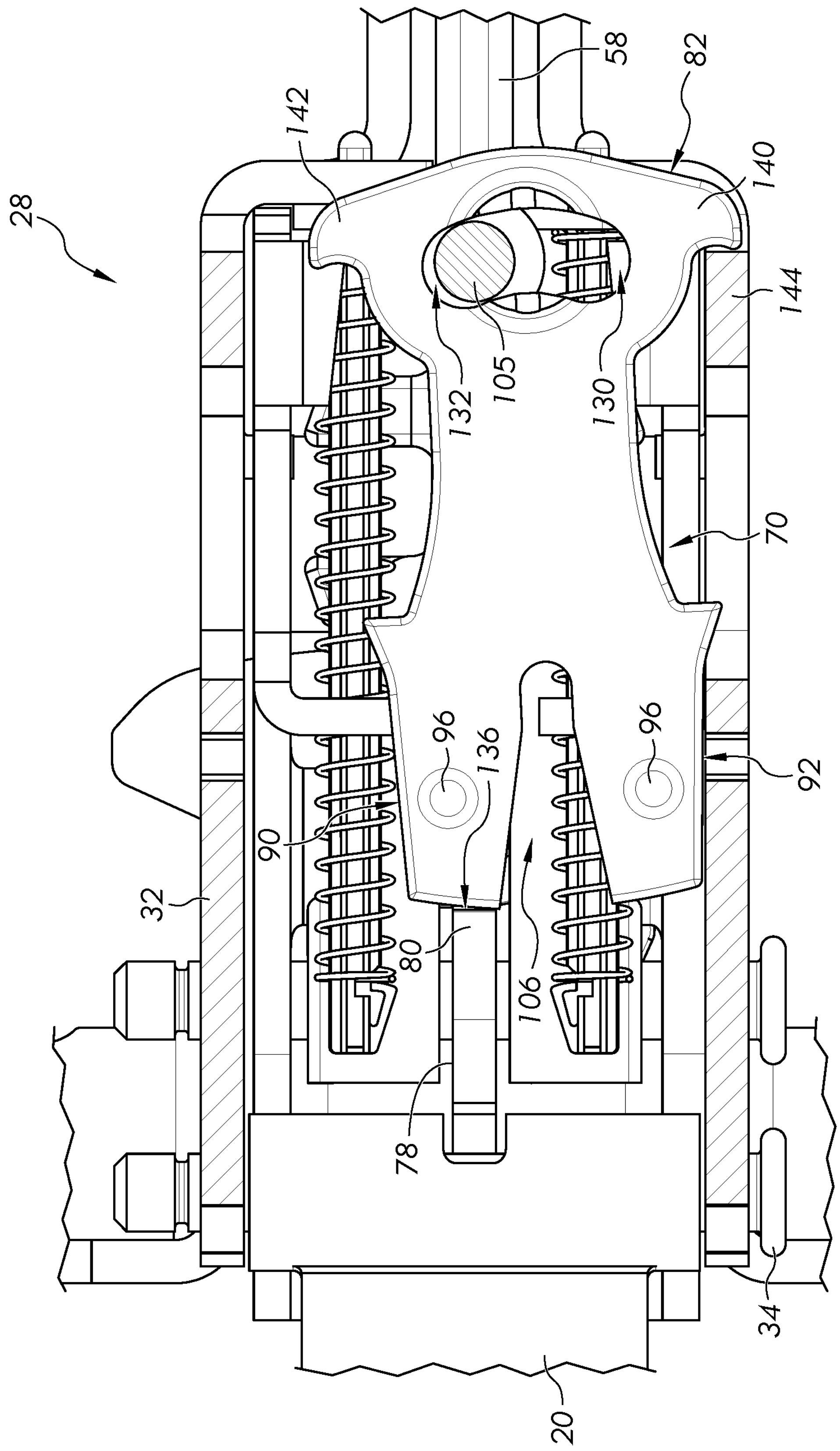
FIG. 12 illustrates a side elevational view of a portion of the latchbolt assembly of FIG. 11B in a security link lock-out mode position.

FIG. 12 is a side elevational view of a portion of the latchbolt assembly of FIG. 11B showing the security link lock-out mode position. As seen in FIG. 12, a portion of the mounting bracket 32 has been removed to illustrate the location of the security link 70 once the keeper 104 has melted. The security link includes a first ear 140 and a second ear 142, both of which are located at the first end 82. In this condition or state, not only has the front edge 136 been located to block movement of the latchbolt link 78, the ear 140 is positioned adjacently to a portion 144 of the housing 32. Since the ear 140 abuts the portion 144 of the housing 32, the ear 144 provides an additional point of contact, a mechanical interface, to substantially prevent movement of the latchbolt 20 and the auxiliary latchbolt 36. The ear 142 provides a function similar to the ear 140 in the event the exit device 10 is installed in a different position. In other embodiments, the link includes only one ear if the exit device is configured to be installed in only one position.

The elongated aperture 88, or slot, is strategically curved to effectively translate movement of the security link 70 along a centerline of the device thereby maintaining a consistent gap condition between the ear 140 and the housing 32 when the security link 70 is transitioning from the "normal security mode" to the "fire lock-out mode". The curvature of the slot 88 maximizes the counter rotation of the security link 70 when the keeper 104 melts away. This controlled counter rotation maintains the blocking action between the security link 70 and the latchbolt pawl 80. In one embodiment, once the security link 70 has moved to the position of FIG. 12, a gap is located between the interface of the ear 140 with the portion 144 of the housing 32.

While the invention has been illustrated and described in detail in the drawings and foregoing description, the same is to be considered as illustrative and not restrictive in character, it being understood that only the preferred embodiments have been shown and described, and that all changes and modifications that come within the spirit of the inventions are desired to be protected.

It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device, comprising:

a latchbolt assembly having an extended position and a retracted position;

a pushbar assembly operably connected with the latchbolt assembly;

a link assembly operatively connected to the pushbar assembly, wherein the link assembly includes a security link comprising an elongated aperture;

a pin extending through the elongated aperture; and a keeper engaged between the pin and the security link, mounted to the pin and received at least partially in the elongated aperture, the keeper configured to melt at a designated temperature;

wherein the security link is configured to shift along the pin from an initial position to a shifted position in response to melting of the keeper; and wherein the security link in the shifted position is configured to pivot about the pin to a blocking position in which the security link prevents retraction of the latchbolt assembly.

2. The exit device of claim 1, wherein the elongated aperture is arcuate.

3. The exit device of claim 1, wherein the security link is biased toward the shifted position.

4. The exit device of claim 3, wherein the security link is gravity-biased toward the shifted position.

5. The exit device of claim 1, wherein the exit device has a first orientation and a second orientation;

wherein with the exit device in the first orientation, the shifted position is a first shifted position; and wherein with the exit device with the exit device in the second orientation, the shifted position is a second shifted position different from the first shifted position.

6. The exit device of claim 1, wherein the exit device has a first orientation and a second orientation;

wherein the elongated aperture has a first end portion, a second end portion opposite the first end portion, and an intermediate portion;

wherein, with the security link in the initial position, the pin extends through the intermediate portion in both the first orientation and the second orientation;

wherein, with the exit device in the first orientation and the security link in the shifted position, the pin extends through the first end portion; and wherein, with the exit device in the second orientation and the security link in the shifted position, the pin extends through the second end portion.

7. The exit device of claim 1, wherein the elongated aperture comprises a shoulder configured to engage the keeper.

8. The exit device of claim 1, wherein the security link comprises a circular seat in which a head of the pin is seated.

9. An exit device, comprising:

a latchbolt assembly;

a pushbar assembly connected with the latchbolt assembly;

a security link comprising an elongated aperture through which a pin extends, wherein the security link during normal operation occupies a home position in which the security link is pivotable about the pin between a retaining position, in which the security link prevents retraction of the latchbolt assembly, and a releasing position, in which the security link permits retraction of the latchbolt assembly; and a keeper mounted to the pin and engaged with the security link, wherein the keeper is configured to melt at a designated temperature;

wherein the security link is configured to move from the home position to a blocking position in response to melting of the keeper; and wherein the security link in the blocking position is configured to prevent retraction of the latchbolt assembly.

10. The exit device of claim 9, wherein the elongated aperture is arcuate.

11. The exit device of claim 9, wherein the elongated aperture and the pin cooperate to guide movement of the security link from the home position to the blocking position in response to melting of the keeper.

12. The exit device of claim 9, further comprising an actuator operable to move the security link between the retaining position and the releasing position during normal operation of the exit device.

13. The exit device of claim 12, wherein the actuator is operable by a key.

14. The exit device of claim 9, wherein the security link is configured to fall under gravitational force from the home position to the blocking position in response to melting of the keeper.

15. An exit device, comprising:

a latchbolt assembly;

a pushbar assembly operably connected with the latchbolt assembly;

a security link having a first operating state and a second operating state, wherein the security link in the first operating state selectively prevents retraction of the latchbolt assembly, and wherein the security link in the second operating state prevents retraction of the latchbolt assembly; and a keeper engaged with the security link and configured to retain the security link in the first operating state;

wherein the security link is configured to move from the first operating state to the second operating state in response to melting of the keeper; and wherein, with the security link in the first operating state, the security link is pivotable between a retaining position which prevents retraction of the latchbolt assembly and a releasing position which permits retraction of the latchbolt assembly.

16. The exit device of claim 15, wherein the latchbolt assembly is configured to extend and retract along a longitudinal axis of the pushbar assembly.

17. The exit device of claim 15, further comprising a pawl operable to move the latchbolt assembly; and wherein the security link is operable to prevent retraction of the latchbolt assembly by blocking movement of the pawl.

18. An exit device, comprising:

a latchbolt assembly;

a pushbar assembly operably connected with the latchbolt assembly;

a security link having a first operating state and a second operating state, wherein the security link in the first operating state selectively prevents retraction of the latchbolt assembly, and wherein the security link in the second operating state prevents retraction of the latchbolt assembly; and a keeper engaged with the security link and configured to retain the security link in the first operating state;

wherein the security link is configured to move from the first operating state to the second operating state in response to melting of the keeper; and wherein the security link in the first operating state is configured to pivot about a pivot axis.

19. The exit device of claim 18, wherein the security link in the first operating state selectively permits movement of the latchbolt assembly.

20. The exit device of claim 18, further comprising a pin extending through an elongated aperture of the security link;

wherein, with the security link in the first operating state, the security link is pivotable about the pin between a retaining position and a releasing position;

wherein the security link in the retaining position prevents retraction of the latchbolt assembly;

wherein the security link in the releasing position permits retraction of the latchbolt assembly; and wherein the elongated aperture is configured to travel along the pin to thereby move the security link from the first operating state to the second operating state in response to melting of the keeper.

* * * * *